Figure 8:
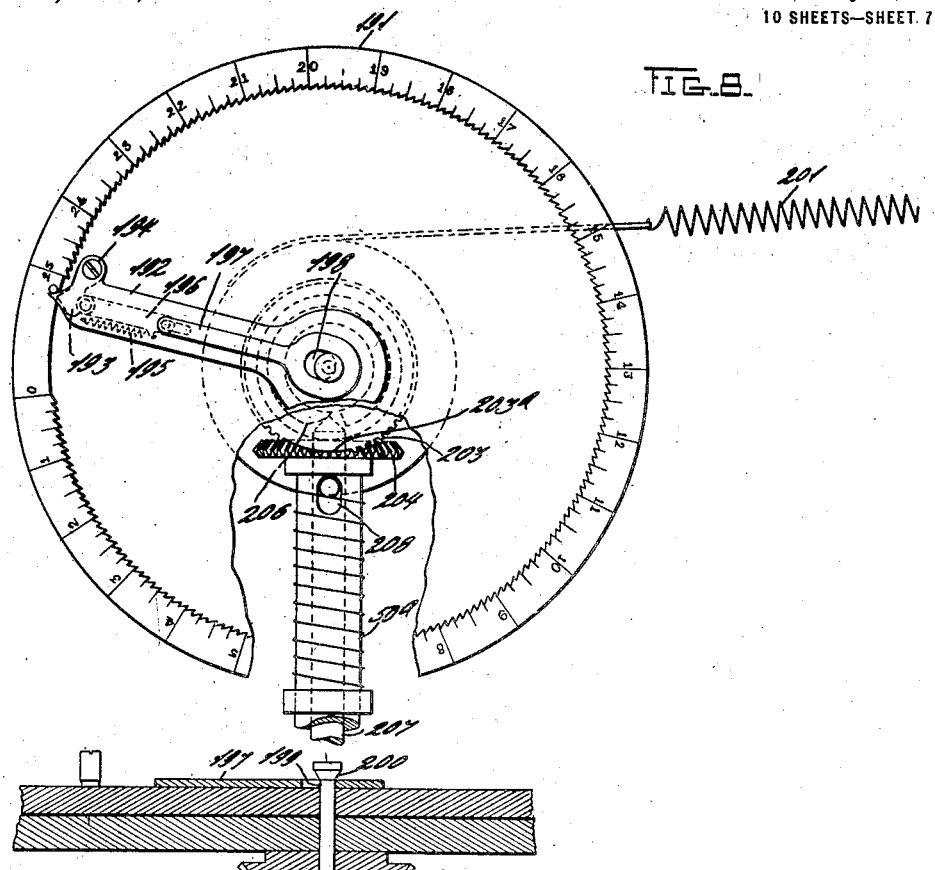

E. S. CHURCH.
COMPUTING AND REGISTERING SCALE.
APPLICATION FILED MAY 28, 1906.
1,190,377.
Patented July 11, 1916.
10 SHEETS—SHEET 1.
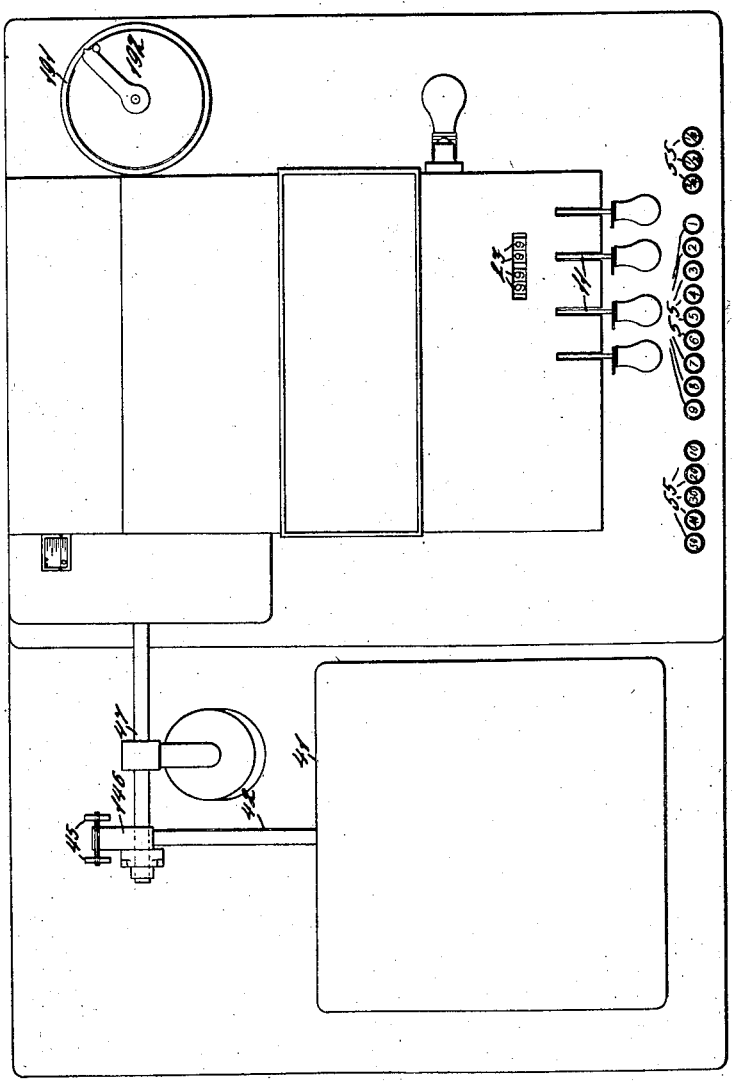

E. S. CHURCH.
COMPUTING AND REGISTERING SCALE.
APPLICATION FILED MAY 28, 1906.
1,190,377.
Patented July 11, 1916.
10 SHEETS—SHEET 2.
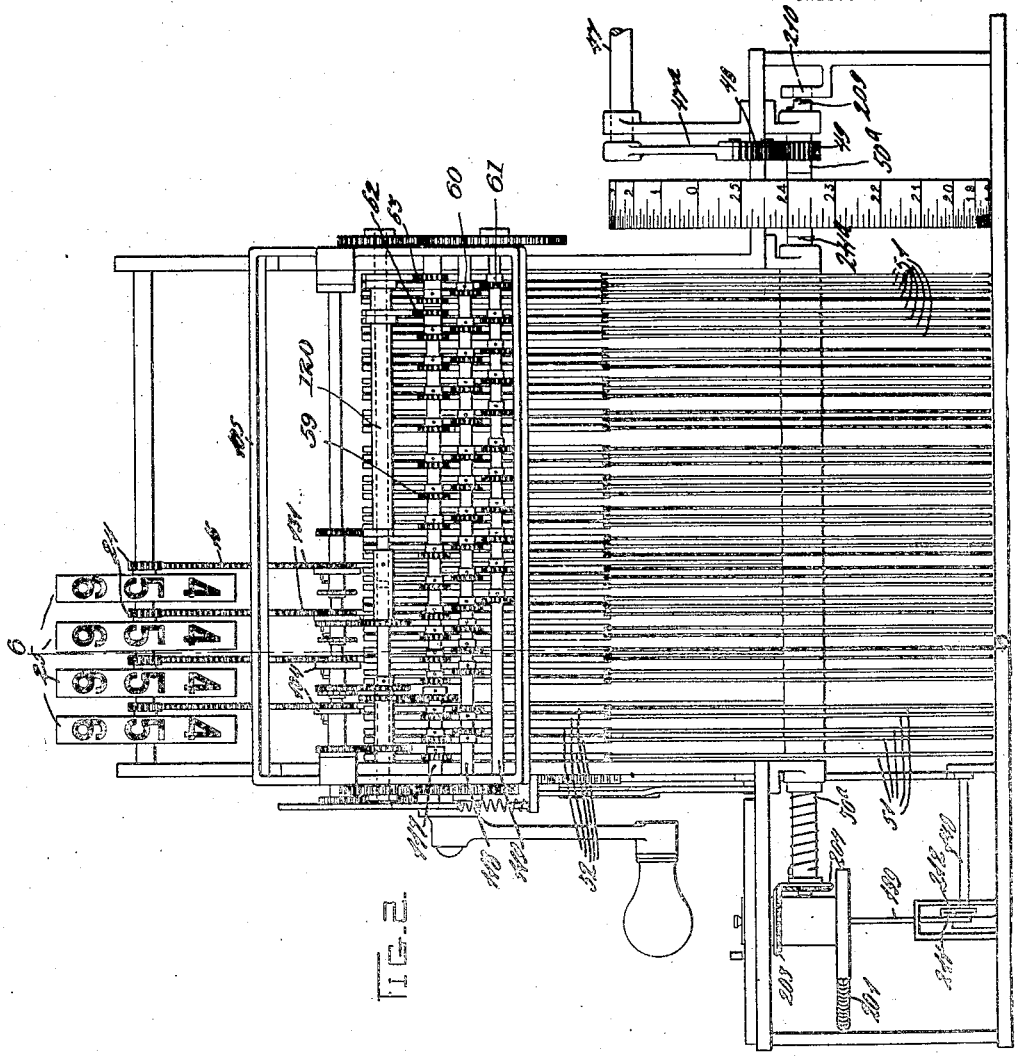
Witnesses
Inventor

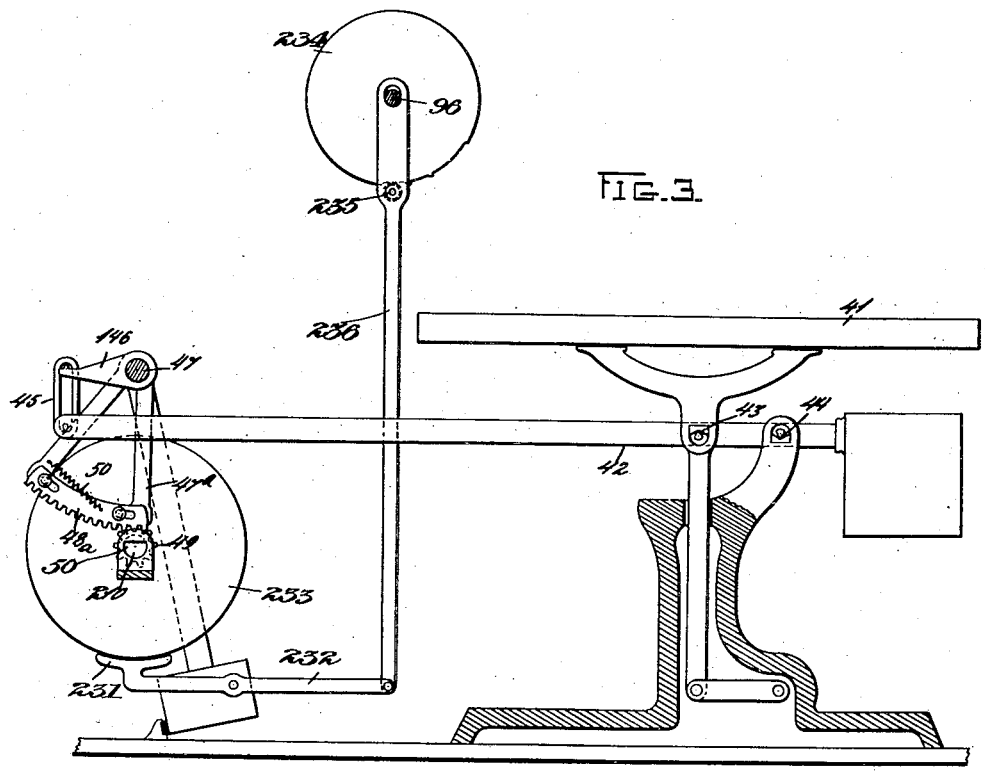
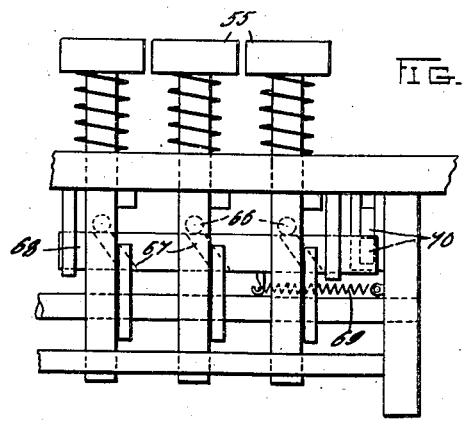

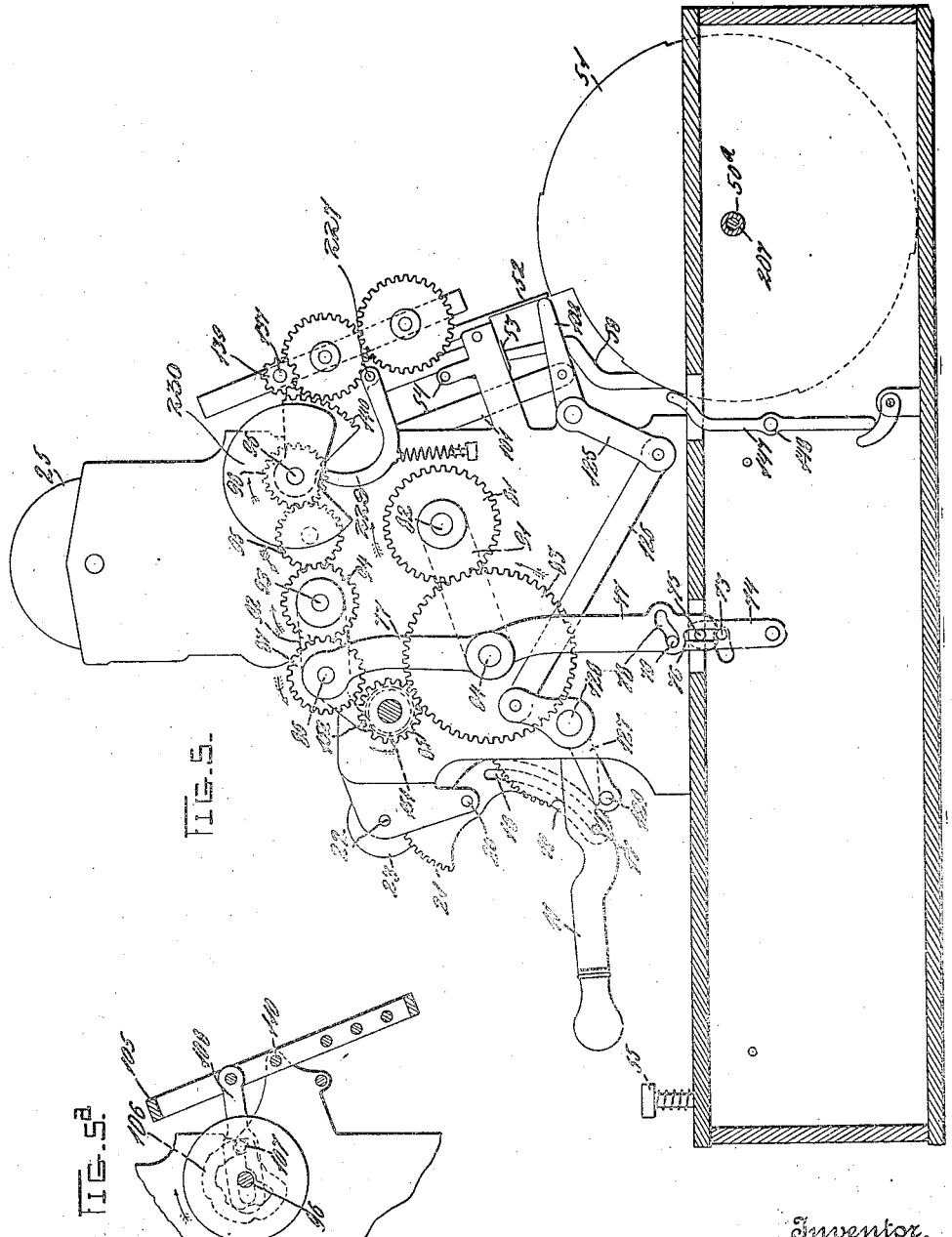

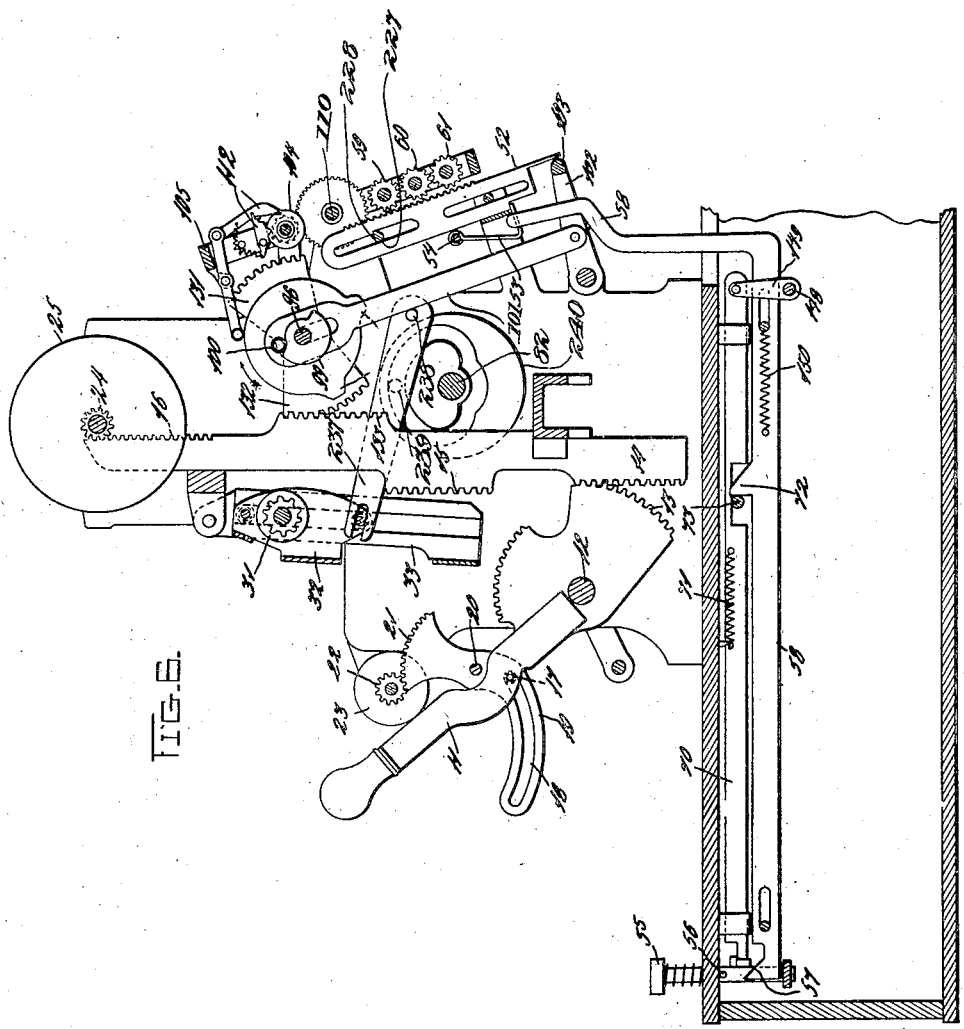

E. S. CHURCH.
COMPUTING AND REGISTERING SCALE.
APPLICATION FILED MAY 28, 1906.
1,190,377.
Patented July 11, 1916.
10 SHEETS—SHEET 6.
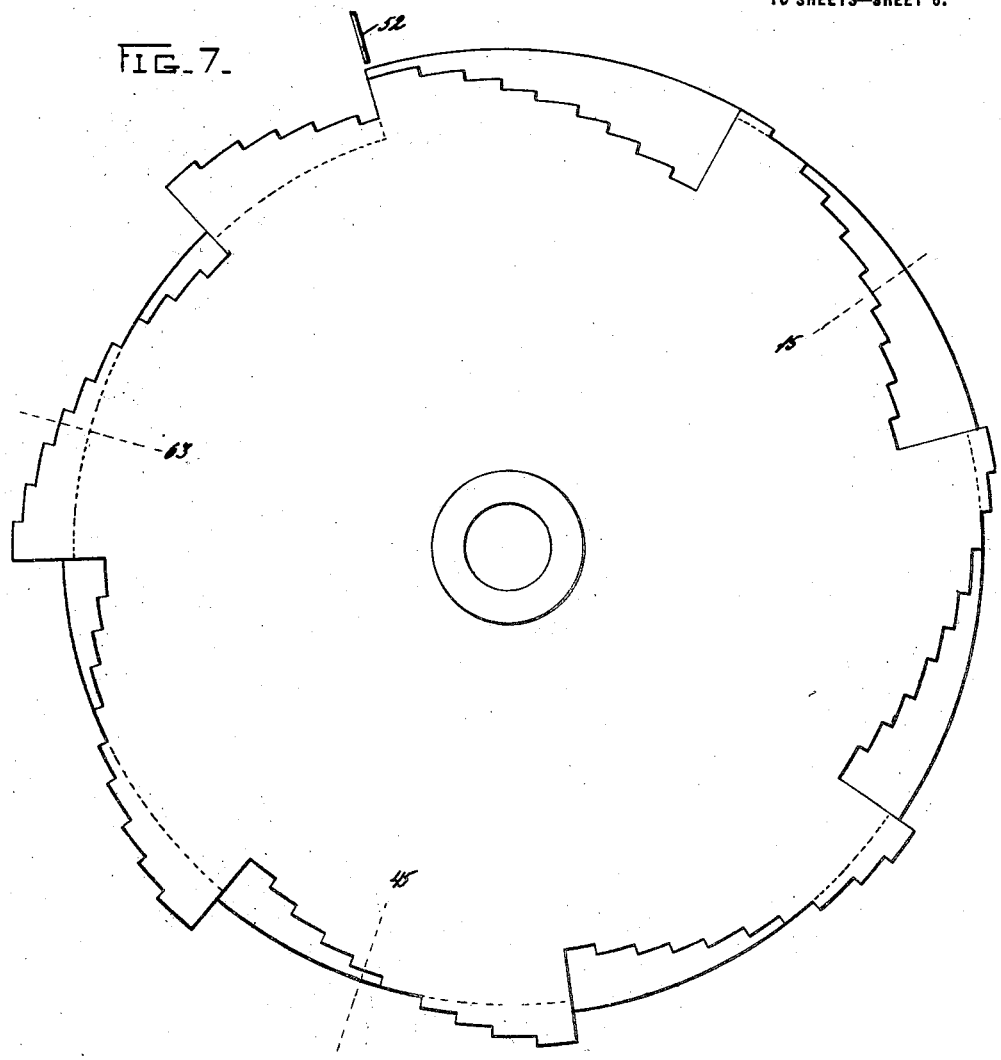
FIG. 7.
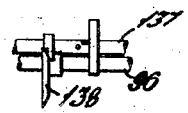
FIG. 7ª
Witnesses
Inventor

E. S. CHURCH.
COMPUTING AND REGISTERING SCALE.
APPLICATION FILED MAY 28, 1906.

1,190,377.

Patented July 11, 1916.
10 SHEETS—SHEET 7.

Witnesses

Inventor
Edmund S. Church
by J. B. Hayward
and A. C. Glass
Attorneys

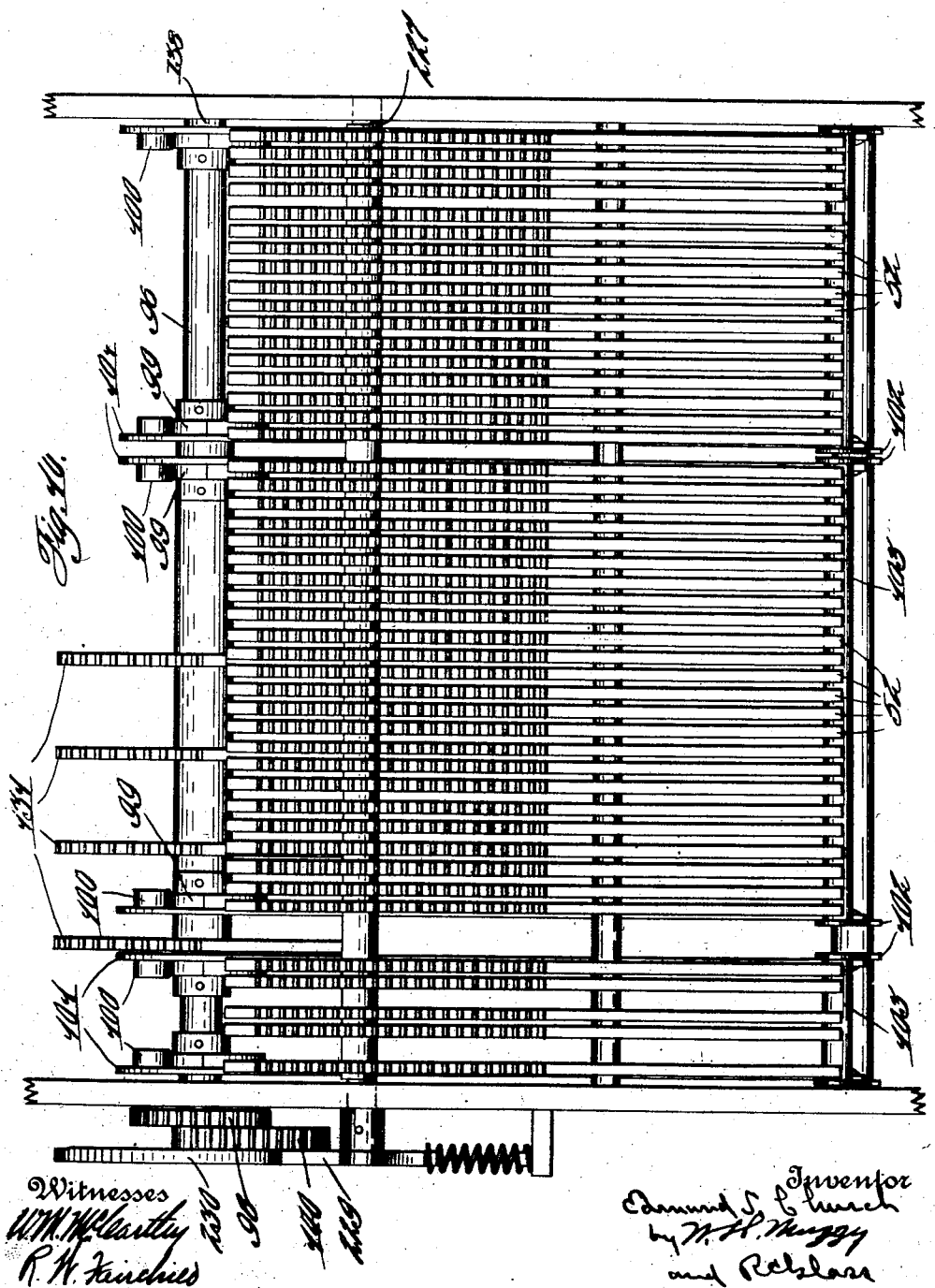

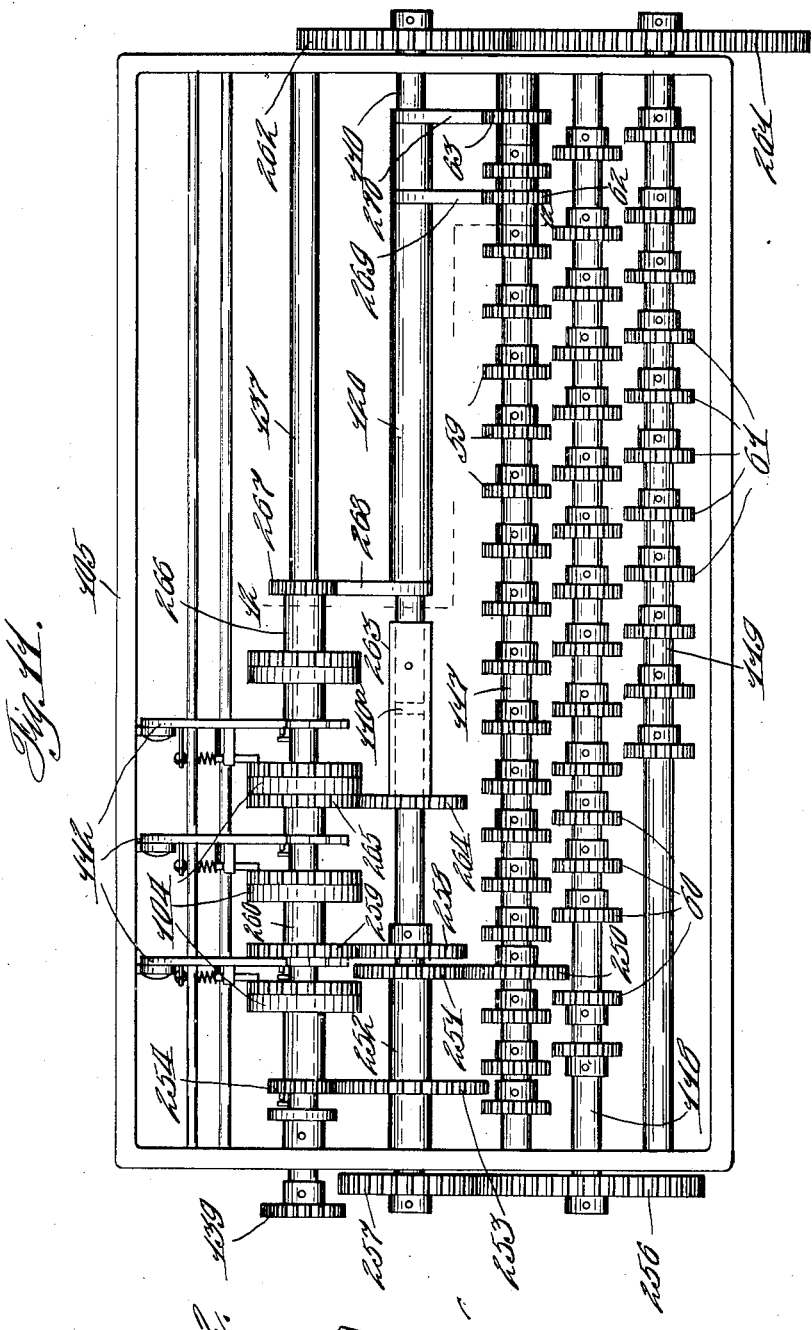

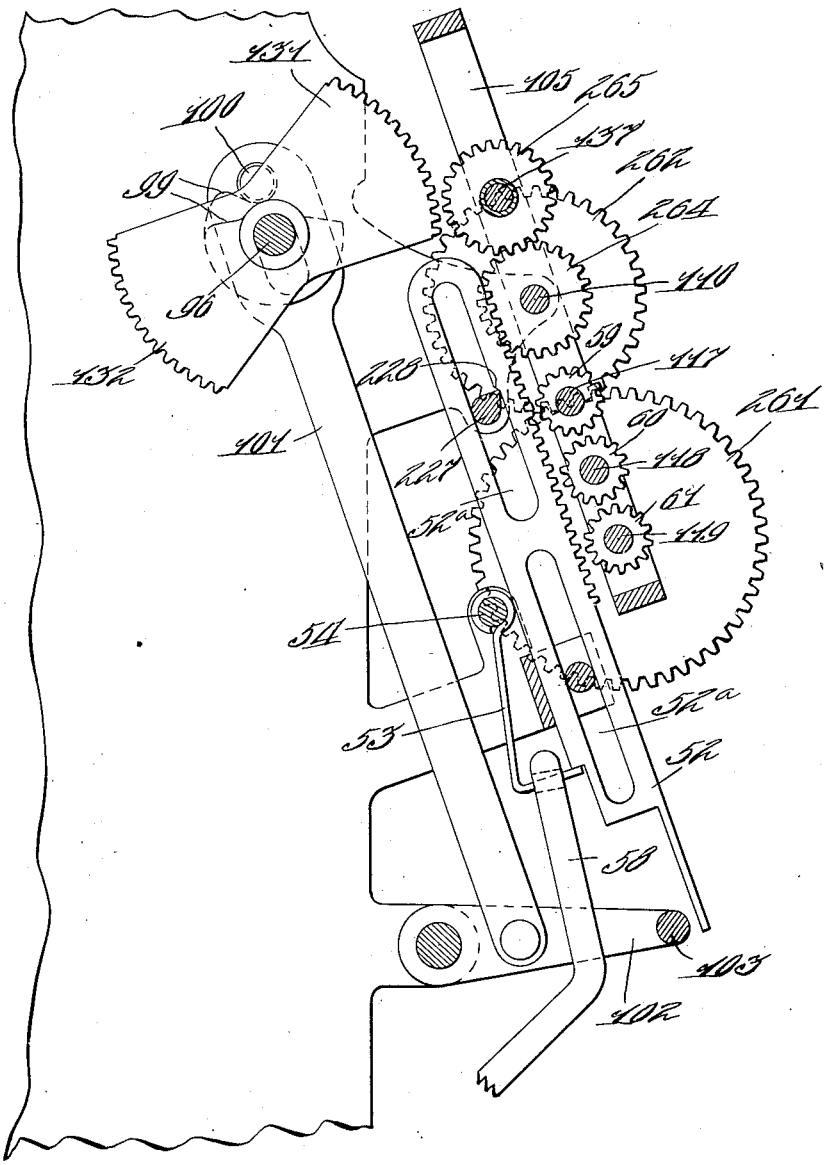

UNITED STATES PATENT OFFICE.

EDMUND S. CHURCH, OF DAYTON, OHIO, ASSIGNOR TO THE NATIONAL CASH REGISTER COMPANY, OF DAYTON, OHIO, A CORPORATION OF OHIO, (INCORPORATED IN 1906.)

COMPUTING AND REGISTERING SCALE.

1,190,377.  Specification of Letters Patent.  Patented July 11, 1916.

Application filed May 28, 1906.  Serial No. 319,162.

*To all whom it may concern:*

Be it known that I, EDMUND S. CHURCH, a citizen of the United States, residing at Dayton, in the county of Montgomery and State of Ohio, have invented certain new and useful Improvements in Computing and Registering Scales, of which I declare the following to be a full, clear, and exact description.

This invention relates to computing and accounting machines, and has for its main object to provide a cash register having as an attachment thereto a computing scale.

The invention contemplates a combined machine of the type referred to, in which a cash register may be used separately to perform all its ordinary functions, or the computing scale may be used to determine the entry of the transaction in the cash register.

The invention further contemplates the use of a well-known cash register now on the market, as to which no novelty is claimed herein, in connection with a computing scale having novel features in itself, and so connected to the cash register that the amount-determining devices thereof may be set automatically to an amount indicated by the computing scale without further effort on the part of the operator.

The invention also has for its object to provide a computing scale on which the amount of a purchase may be indicated, and the amount then added into the cash register or not as the operator chooses.

A further object is to provide an alternative controlling means for the computing mechanism. In many cases it will be desired to compute a product, one of the factors of which is a quantity, such, for example, as a number of yards of cloth. In such cases, of course, the scale will be of no advantage. There is therefore provided an alternative means, the embodiment of which in the present machine is a pointer adapted to be manually moved over a scale, and in its movement to exercise the same control over the computing mechanism as that exercised by the scale. Interlocking means are provided between the quantity indicator and the scale, whereby if either is moved, the other is locked from operation. The quantity indicator when used is designed to take precisely the part occupied by the scale in the device.

With these and incidental objects in view, the invention consists in certain novel features of construction and combinations of parts, the essential elements of which are set forth in appended claims and a preferred form of embodiment of which is hereinafter specifically described with reference to the drawings which accompany and form part of this specification.

Figure 9:
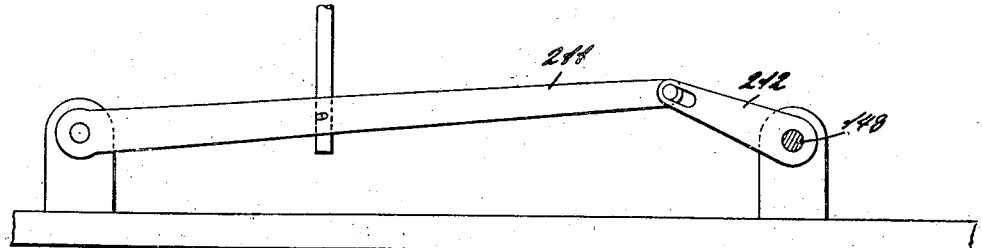

Of said drawings: Figure 1 is a plan view of the combined machine. Fig. 2 is a rear elevation of same, with the casing removed. Fig. 3 is an elevation of the scale and attached parts. Fig. 4 is a detail, showing the rate-per-unit devices, and detents associated therewith. Fig. 5 is an elevation of the right-hand end of the machine. Fig. 5ª is a detail, showing the counter-throwing cam. Fig. 6 is a transverse section through the machine on line 6—6 of Fig. 2. Fig. 7 is a diagrammatic view of the three-cent amount-determining disks. Fig. 7ª is a detail of the zero setting devices. Fig. 8 is a plan view of a quantity indicator. Fig. 9 is a vertical section of the same. Fig. 10 represents an enlarged partial rear elevation of the machine with the frame containing the sub-counter removed. Fig. 11 represents an enlarged rear elevation of the frame containing the sub-counter. Fig. 12 represents a detail sectional view taken on line 12—12 of Fig. 11. Fig. 13 represents an enlarged section through the sub-counter frame.

Described in general terms, this invention comprises a cash register of a well-known type, and a novel computing scale associated therewith. A weight-controlled balance is used, and the placing of a quantity of material on the scale serves to cause its operation to a proportionate amount, as is usual. Such operation is adapted to rotate a plurality of amount-determining disks having graduated peripheries, and against which a series of controlling bars are adapted to abut when released. When the determining disks have been set and the crank handle or other operating means is operated, the controlling bars move to a position determined by the graduations on the peripheries of the determining disks, and thereby set up on a sub-counter an amount determined by the weight on the scale and the rate per unit of weight. This latter factor is provided for by a series of keys which are adapted to release the proper controlling bars and permit them to move. When the amount is set up on the sub-counter, as referred to, a further movement of the handle causes this amount to be transferred to the register-controlling devices of the cash register, the sub-counter being meanwhile reset to normal position. This ends the first stage of the operation, the product having been computed and set up on the cash register indicating devices, and all the usual functions of a computing scale are thereby performed, inasmuch as the operator can then see the product desired. A further movement of the handle will now cause the usual operation of the cash register. If, on the other hand, it is not desired to enter the transaction in the cash register, as, for example, if the customer decides not to complete the purchase, the machine may be left just as it is, with clerk's indication showing. Another quantity may be placed on the scale, when the above referred to operation may be repeated. It will thus be seen that the machine may be used as a simple computing scale, or it may be used to automatically register the amounts determined by the scale.

Inasmuch as many transactions would involve a quantity of material, such, for example, as a number of yards of cloth, this of course could not be computed by the scale, and there is, therefore, provided an alternative means for controlling the computing devices, consisting of a lever movable over a scale, and serving to actuate when desired the controlling disks referred to. The operation when the quantity indicator is used is the same as that with the scale; that is, the quantity pointer is moved to a position depending on the number of units of quantity, and the keys representing the rate per unit are also depressed. An operation of the crank handle then completes the movement of the mechanism.

By the term "computing mechanism" used throughout this specification and the claims, it is intended to cover any form of mechanism whereby the product of a plurality of factors may be determined and by the term "rate mechanism" it is intended to cover any form of mechanism for determining the factor used in the computation corresponding to the rate or price per unit of the article to be sold, as price per pound or per yard.

The cash register to which the invention is shown as adapted is best shown in Fig. 6. It comprises generally a series of setting levers 11, loosely journaled on a rod 12, and rigid with said levers are segments 13, gearing with rack bars 14. These rack bars each has a counter operating rack 15 and an indicator operating rack 16 thereon. The setting levers 11 each carries an anti-friction rack 16 thereon. The setting levers 11 each carries an anti-friction roller 17, moving in a slot 18 in a lever 19. This lever 19 is journaled on a pin 20, and at the upper end thereof has a segment rack 21, gearing with a pinion 22, rigidly attached to a clerk's indicator 23. When the setting levers 11 are moved from their normal position, shown in this figure, movement of the rack bar 14 takes place, and thereby causes movement of the indicator pinion 24 and the indicator 25. Inasmuch, however, as in the ordinary operation of the machine a flash or shutter is arranged to cover indicators 25, the small clerk's indicators are provided, which are always visible, and which aid as an indication of the position of the levers. A counter 31 is mounted in a movable frame 32, arranged to slide in a second frame 33. This counter 31 is adapted to be moved downward and back at each operation of the machine, thereby engaging one or more of the teeth 15 on the rack bar 14, and causing the operation of the counter. This counter is more fully described in United States patent to Thomas Carroll, No. 751,611.

The scale used in the machine is shown in Fig. 3, and comprises a scale pan 41, supported on a lever 42 by a knife edge 43. Lever 42 is also pivoted on a knife edge 44, and is adapted through a link 45 to rock lever 146, journaled on a pin 47 in the frame of the machine. Movable with lever 146 is a segment 47$^a$, attached to which by a lost motion action is a rack bar 48. The purpose of the lost motion connection is to prevent back lash between the rack teeth of the segment and the teeth of a pinion 49. A spring 50 connecting the segment 47$^a$ and the rack bar 48 serves to draw the rack bar in one direction.

As shown in Fig. 2, the pinion 49 is carried by a transverse shaft 50$^a$, extending across the back of the machine. This shaft carries a number of determining disks 51, also shown in Fig. 5, which are adapted to limit the movement of a plurality of controlling bars, there being one bar for each disk. These bars are best shown in Fig. 6 at 52, and are normally elevated above the highest part of the peripheries of the disks. They are held latched by supports 53, all of which are journaled on a rod 54. A plurality of rate per unit keys 55 are adapted to release said controlling bars when the keys are depressed. To accomplish this purpose, each key is provided with a pin 56, adapted to engage and move the cam edge 57 of a longitudinal bar 58. This bar has a notch through which the support 53 moves, and it is evident that a forward movement of bar 58 will carry the proper support 53 forward with it, and thereby release the controlling bar 52.

As shown in Fig. 1, there are a plurality of rate per unit keys, arranged in banks and adapted to compute amounts, at prices varying from one-fourth of a cent up to 59 3/4 cents. As shown the scale is adapted to weigh amounts up to 25 pounds, so that it will be evident that the highest possible product to be computed will include four denominations. This, therefore, renders necessary the use in some instances of four controlling disks 51, corresponding to a rate per unit key. As shown in Fig. 2, there is one disk for the one-fourth cent key, and two disks for each of the keys from one-half to and including three cents; three disks for each of the keys from four cents to and including thirty cents, and four disks each for the forty and fifty-cent keys. The controlling bars 52 are severally adapted to gear with one of a plurality of pinions 59, 60 or 61, shown in Figs. 2, 6 and 13. In addition to these pinions, extra pinions 62 and 63 are provided for the fourth or $10 controlling bar used in connection with the 40 and 50-cent keys.

After the controlling disks have been turned to correspond to the weight on the scale, the proper rate per unit or price keys are depressed, and this releases and allows to drop the proper controlling bars 52. These bars drop differentially, depending on the positions of the controlling disks. The two disks connected with the three-cent controlling bar are shown separately in Fig. 7. In this figure the controlling bars 52 are also indicated. There are two disks in connection with the three-cent key, one with a series of short steps for the units denomination of the product, and the other with a series of long steps. It will be seen by a study of the first mentioned disk that it is calculated to give the store proprietor the advantage of all fractions of a half cent or over, and to give the purchaser the advantage of all fractions less than a half cent, but it will be evident that to change this principle would simply need some slight changes in the relative positions of the steps. As an example of the use of the device, it may be pointed out that at the point marked 15, the units disk is depressed five steps, and the tens disk depressed one step. The disks would be moved to bring this point under the controlling bars 52 when five pounds is placed on the scale, and when the controlling bars then drop the units bar will move five steps, and the tens bar one step. At the point marked 45, the bars 52 will drop, the tens bars dropping four steps and the units bar dropping five steps. This point on the disks will be brought under the controlling bars 52 when fifteen pounds is placed on the scale. The point marked 63 will evidently be brought under the controlling disks by a weight of twenty-one pounds, and in such case the controlling bars 52 will drop, the units bar dropping three steps, and the tens bar dropping six steps. Further examples might be given, but it is thought that these three will be sufficient to illustrate the operation of the device, the position of the steps being merely a matter of calculation. It will of course be evident that the disks for the different amounts must be calculated separately, and will in most cases be unlike each other.

It would of course be possible to hold the rate per unit keys in depressed position by the pressure of a finger thereon, but there is provided a detent means for doing this. Referring to Fig. 4, the rate per unit keys 55 are shown as each carrying a pin 66. These pins are adapted to move when the key is depressed through cam slots 67 in a detent bar 68, thereby moving the detent bar against the tension of a return spring 69. Near one end of the detent bar is a bar 70, best shown on Fig. 6, at a right angle with the bar 68. When the bar 68 is moved to the left in Fig. 4, bar 70 will be released and moved forward under the tension of spring 71 and lock detent 68 in its new position, thereby retaining the rate per unit keys depressed. Bar 70 is at the end of the first part of the operation retracted to release the keys by means which will be described later.

The mechanism for entering the computed amounts on the sub-counter will now be described, with reference to Figs. 5 and 6. When the rate keys 55 are depressed, moving bars 58 forwardly, projections 72 on said bars are adapted to engage and move a rod 73. The rod 73, as shown in Fig. 5, is carried by frame arms 74 which also carry a pin 75 moving in a slot in the lower one of two links 77. The lower link 77 has a cam slot 78 adapted to move past a pin 79 mounted in the main frame and the upper link 77 provides means for controlling connection and disconnection of the amount operating devices of the machine. As will be seen from Fig. 5, a gear wheel 81 is journaled on a shaft 82 and is adapted to gear with a larger wheel 83 journaled on a floating shaft 84, which also supports the ends of the two links 77, and is further adapted to gear with an operating gear wheel 85. The upper link 77 also carries a stub shaft 86 on which is journaled a gear wheel 87 also adapted to mesh with operating gear 85. The shaft 84 carries a link 91 connected to shaft 82 and a link 92 connects the shaft 86 with the shaft 93 which carries a gear wheel 94.

Rotation of the shaft 82 occurs when the gear 83 is in mesh with the gear 85 and causes reciprocation of the counter 31 over the racks 15 and the addition on said counter of an amount corresponding to the setting of the racks 15. The reciprocation of the register is effected by the lever 237 which is connected at one end to the counter frame 32 and at its other end is pivoted to the frame of the machine at 238. Intermediate of its ends is journaled a roller 239 which projects into a cam groove in a disk 240 rigid on the shaft 82. It will be seen that by one revolution of the cam 240 the counter will be drawn down over the racks 15 and returned to normal position.

In Fig. 5 the mechanism is shown in normal position with the gear 83 meshing with gear 85 which is the main operating gear of the machine and is adapted to be manually operated, and gear 87 separated from gear 85. When the rate per unit key is depressed the rod 73 is moved forward, thereby oscillating lower link 77. As this link oscillates forwardly its cam slot 78 will force it downwardly, thereby withdrawing gear 83 from connection with gear 85, and connecting gear 87 thereto. The train of gearing shown at the top of the figure, and including the wheels 87, 94, 95 and 98 will be thrown into connection with the main operating gear 85. The gear 98 is rigid on shaft 96 and also rigid with this shaft are cams 99, see Figs. 6 and 10. These cams 99 engage with anti-friction rollers 100 projecting from the upper ends of links 101, which are connected at their lower ends with the frames 102 comprising side arms and connecting rods 103. There is one of these frames 102 for each bank of keys 5 and they are rocked by the cams 99 to return the previously released controlling bars thereby actuating a sub-counter 104 hereinafter described. The frames 102 are rocked successively so as to insure the entering of the proper amount upon the sub-counter. The sub-counter 104 is mounted upon a shaft 137 in a frame 105. This frame as shown in Fig. 5ª, is adapted to be oscillated both forwardly and rearwardly from normal position by a box cam 106 secured upon a shaft 96. One end of a link 108 straddles the shaft 96 while the other end of said link is connected to the frame 105 above its pivotal point. An antifriction roller 107 is carried by the link 108 and projects into the groove formed in the cam 106. The shape of the cam groove is such that the frame 105 is first oscillated rearwardly at the top and then forwardly three times and is then moved very much farther forward than before and finally returns to normal position. The first three oscillations are for the purpose of throwing the lower part of the frame carrying pinions 59, 60 and 61 into mesh with the controlling bars. It is evident that, inasmuch as frame 105 is journaled near its middle on shaft 110, a rearward motion of the top of the frame will cause a forward motion of the bottom thereof carrying the pinions 59, 60 and 61 into engagement with the controlling bars 52. It will be understood that each key 55 controls a number of bars 52 corresponding to the number of denominations in the product obtained by multiplying the rate per unit by the capacity of the weighing mechanism. For instance, the ¼ cent key will only control a single bar 52, as the capacity of the weighing mechanism as shown is limited to 25 pounds, the 5¢ key will control three bars, namely, the cents, dimes and dollars, while the 40 and 50 cent keys will control bars of four denominations.

As previously described, the frames 102 return the bars 52, controlled by the different banks of keys successively from the higher to the lower denominations which requires the three oscillations of the frame 105, so as to allow the bars 52 controlled by the keys of the banks of lower denominations to return, by gravity or suitable springs to their previously adjusted positions when the pinions 59, 60 and 61 are disengaged from the said bars. The cams 99 for returning the bars 52 through means of the frames 102, are so constructed that as the bars 52 controlled by the different banks of keys are returned they prevent said bars from dropping below their returned position until other means hereinafter described is brought into play, after which the frames 102 return to their normal position.

It will be seen from the above description and by reference to Figs. 2, 7, 10 and 11 that if an article weighing two pounds and valued at 3½¢ per pound was placed upon the scale the determining disks 51 would be rotated to such an extent that when the bars 52 controlled by the ½¢ and 3¢ keys, which are the second and third and the tenth and eleventh ones respectively from the left in Fig. 10, representing the units and tens denominations, the units bar controlled by the ½¢ and 3¢ keys would drop one and six spaces respectively while the tens bars controlled by said keys would contact with the periphery of their corresponding disks 51. Now upon operating the machine the pinions 59, 60 and 61 will engage with the controlling bars and the right hand frame 102 in Fig. 10 will be rocked to restore any bars 52 that might have been released. The lower portion of frame 105 is then moved rearwardly to disengage the pinions from the bars 52, after which the frame 105 is drawn forwardly to reëngage the pinions with the bars and then the middle restoring frame 102 rocked by which movement the units bars 52, controlled by the 3¢ key will be restored and actuate the sub-counter 104. The pinions 59, 60 and 61 are fast upon shafts 117, 118 and 119 respectively and actuate the cents, dimes and dollars denominations of the sub-counter 104 as hereinafter described. From this it will be seen that as the units bar 52 controlled by the 3¢ key is returned, it also carries with it the units bar controlled by the ½¢ key, which, after the pinions are disengaged the second time from the bars 52, descends to its previously adjusted position, while the 3¢ units bar is held in its raised position by the rod 103 in its frame 102 as previously described. As the pinions 59, 60 and 61 and the bars 52 are engaged for the third time and the left hand frame 102, as shown in Fig. 10, is rocked, the ½¢ units bar will be restored and actuate the sub-counter 104 one space, which in addition to the six spaces added to the sub-counter, by the 3¢ units bar represents the product of the transaction. The bars 52 are allowed to move nine spaces in either direction by means of the elongated slots 52$^a$.

It will be seen from the above description that if the bars 52 were not returned successively an incorrect registration would be made.

Referring now to Figs. 2, 11 and 12 the connections between the different denominations of the sub-counter 104 and the pinions 59, 60, 61, 62 and 63 will be described. The units bars 52 as previously described are arranged to be engaged by the pinions 59 secured to the shaft 117. Fast to this shaft is a gear wheel 250, which meshes with a similar wheel 251 secured to one end of a sleeve 252 loosely mounted upon the shaft 110. The other end of the sleeve 252 carries a gear wheel 253 which meshes with a pinion 254 secured to one end of a sleeve 255 surrounding the shaft 137. This sleeve at its other end carries the units denominational wheel of the sub-counter 104. Pinions 60, which are actuated by the tens bars 52, are secured to the shaft 118, the latter having a gear wheel 256 fastened to its left hand end, see Fig. 11, which meshes with a smaller gear wheel 257 secured to one end of the shaft 110. This shaft is broken as at 110$^a$ and near the center of the left hand portion, as shown in Figs. 2 and 10, is secured a gear 258, which meshes with a similar gear 259, secured to one end of a sleeve 260 surrounding the shaft 137. The other end of the sleeve 260 has fastened thereto the tens denominational wheel of the sub-counter 104. The shaft 119, which carries the pinions 61 actuated by the units of dollars bars 52, has secured to its right hand end, looking from the rear, a gear wheel 261, which meshes with a smaller wheel 262 secured to the right hand end of the broken shaft 110. The inner end of this part of the shaft has secured to it one end of a sleeve 263, the other end of which carries a gear 264 that meshes with a similar wheel 265 attached to the units of dollars wheel of the sub-counters. The sleeve 263 also acts as a support for the inner end of the left hand portion of the shaft 110. The tens of dollars wheel of the sub-counter is secured to a sleeve 266, which has secured to its outer end a pinion 267 that meshes with a segment 268 secured to one end of a sleeve 120 surrounding the right hand portion of the shaft 110. At its other end the sleeve 120 carries segments 269 and 270 which mesh with pinions 62 and 63 respectively, that are in turn actuated by the tens of dollars bars 52. The pinions 62 and 63 as previously described, are loosely mounted upon the shaft 117 and are held from lateral movement by suitable collars.

A transfer device indicated generally by 112 is shown on Figs. 6 and 11, and this differs from the usual register only in having two sets of transfer cams 113. This is rendered necessary by the fact that in some cases two transfers must take place in one operation of the machine, which of course never happens in an ordinary adding register. If, for example, a purchase of 24 pounds, 14 ounces, at 48 3/4 cents, was made, two transfers would be necessary. As above indicated, the amount corresponding to 40 cents would first be added in, this being $9.95. The amount corresponding to 8 cents, being $1.99, would next be added, and a transfer will evidently here be necessary. When the third amount—to wit, 19 cents, corresponding to the 3/4 cent key, is added, a second transfer will be required. This would also be true with many other amounts. The movement of links 101 to restore the controlling bars 52 is also utilized to reset to zero the setting levers 11. As shown in Fig. 5, the left hand frame 102 is connected by a lever 125 to a link 126, which is connected to and moves a bell-crank lever 127, journaled on a bar 128. This bell-crank lever 127 is part of a frame, including a rod 129, which is normally under the setting levers 11. When frame 102 is raised, a clockwise motion of bell-crank 127 is produced, thereby returning the setting levers to the position shown in Fig. 6, which is the normal position. When links 101 descend again, the connections referred to are restored to the position shown in Fig. 5, and levers 11 may again be operated.

When the amounts have been added on the sub-counter 104, it is desirable to transfer these amounts to the indicating devices 23 of the machine, in order that the operator may obtain the benefit of the computation. As previously stated, the frame 105 is finally rocked forward at the top by the last depression in box cam 106. This serves to throw the counter wheels 104 into mesh with a series of segment-racks 131, journaled loosely on shaft 96. These segment-racks have a second segment 132 connected therewith, and these racks 132 are adapted to engage racks 133 on the indicator-operating rack-bars 14. When the counter 104 is thrown into gear with racks 131, and then reset, it is evident that rack-bars 14 will be moved to set up an equal amount. This will cause movement of the setting levers 11, and the clerk's indicator 23 thereby placing the cash register in condition for operation. The means for resetting the counter is shown in Fig. 5, and inasmuch as it is necessary that the counter should be moved backward to zero instead of forward, as is the case with the usual shaft and notch resetting device, there is provided means for causing a slight longitudinal movement of the shaft 137 carrying the counter wheels 104. Said counter wheels have each a pin projecting laterally therefrom, with which in its moved position pins on the shaft 137 are adapted to engage. See Fig. 7ª. This longitudinal movement of the shaft is caused by a cam 138 moved with shaft 96, and which engages a bevel on shaft 137 and shifts the said shaft just prior to engagement of the setting pinion by segment-rack 140. This rack is rigid with shaft 96, and is shown in Fig. 5 in its normal position. When a complete rotation is given of shaft 96, at the very end of this rotation the segment-rack 140 will gear with pinion 139, which has then been drawn forward, and cause a complete rotation of same, thereby resetting any of the counter wheels which have been moved forwardly by the controlling bars 52. The type of zero setting device referred to is well known in the art. This first part of the operation is also utilized to release the rate keys 55 through the movement of the lever 125, as shown in Fig. 5. When links 101 are raised, lever 125 is rocked rearwardly and engages and moves a lever 147, rigid on shaft 148. This shaft, as shown in Fig. 6, has also rigid therewith a lever 149 connected to the detent-locking bar 70, above referred to. A rearward movement of this bar will release the detent bar 68, and allow the keys 55 to rise under the influence of their springs. The release of the keys allows the bars 58 to move rearward under the tension of springs 150, and bar 70 will then reset the rod 73, thereby ungearing gear-wheel 87 from gear-wheel 85, and throwing gear 83 into connection therewith. This, however, does not take place until a complete rotation of main-operating gear 85, owing to a flange 151 carried by said gear. When lever 77 is depressed to carry gear 87 into mesh with gear 85, a pin 152, movable with the said lever, is carried downwardly through a notch in flange 151. When pinion 85 is then rotated, the flange 151 passes over pin 152 and holds it depressed until a complete rotation of pinion 85, when it is again allowed to rise. This is rendered necessary by the fact that the rate keys 55 are released after a half rotation of the operating handle, in order that supports 53 may engage under the controlling bars 52 as soon as they have been raised.

A complete description of the operation of the machine as a computing scale has now been given. It will be seen that, as described, the machine is complete, inasmuch as by one turn of the main operating gear 85, the product has been computed and set up on the indicating disks 23, where the operator may observe it. If the customer does not complete the purchase, the machine may be left in this set position until a second computation is to be made. The placing of the second weight on the scale pan 41 and turning the handle once more will indicate the new product, inasmuch as the setting levers 11 and the register-operating racks 14 are reset to normal position at each operation.

The operation of the device, as thus far described, will be as follows: Suppose a weight of 17 pounds is placed on the scale, and it is desired to compute the value of this quantity at 31 3/4 cents, the operation will comprise the placing of the weight on the scale pan 41 and depression of the rate per unit keys 55, corresponding to 30 cents, to one cent, and to three-fourths of a cent, and one turn of the operating handle. When the weight is placed on the scale pan 41, lever 42 will be rocked around its pivot at knife edge 44 and cause a rotation of shaft 50ª, carrying the amount determining disks shown in Fig. 2. This shaft and the disks thereon will be rotated 17/25ths of a complete rotation. The depression of the three rate per unit keys will then release the corresponding supports 53 for the controlling bars 52 by moving levers 58 forwardly. The keys will be held in depressed position by the forward movement of bar 70, which is permitted when the detent 68 moves to the left, as shown in Fig. 4. The forward motion of levers 58 will move bar 73, and through the cam device shown in Fig. 5 will lower the two gears 83 and 87, thereby bringing gear 87 into mesh with the main operating gear 85, and connect the computing devices to the operating handle. The operating handle is then given one complete rotation. The first part of the rotation will raise the link 101, corresponding to the dimes keys, and thereby restore the controlling bars 52, which have been released by the 30-cent key. At this time the frame 105 has been rocked forwardly at the lower end by the box cam 106, in Fig. 5ª, and the dollar pinions 61 and dimes pinions 60 are engaged and moved by the return of the dimes-controlling bars 52. The cents-controlling bars 52, and the fractions of cents bars are returned successively, and between these two returns, and after the latter return, the frame 105 is rocked rearwardly at the lower end twice to allow the transfers to be turned in if necessary, it having been pointed out above that in the operation of this machine two transfers would frequently be required in succession. When the fraction-frame 102 is raised, lever 125 will be rocked, and through the bell-crank 127 and bar 129 will raise the levers 11 to the position shown in Fig. 6, thereby resetting the register-controlling devices to normal position. As lever 125 rocks rearwardly, it abuts the lever 147 and thereby releases the keys, but rearward movement of the rod 73 is prevented until a complete rotation of the gear 85 through the flange 151 and pin 152. During the second half of this complete rotation, counter shaft 137 is slid longitudinally by the cam and bevel referred to, thereby bringing the resetting pins on said shaft into register with the pins of the counter-wheel. Frame 105 is then rocked forward by the last depression in box-cam 106, to bring the pinion 139 on counter-shaft 137 into mesh with segment-gear 140. This causes a complete rotation reversely of counter-shaft 137, and the counter-wheels 104 are thereby picked up and returned to zero. As they are at this time in gear with segments 131, the amount previously indicated on the counter is caused to be now set up on the indicating-devices 25 of the cash register, and this also causes movement of the setting levers 11 and rack-bars 14 to a corresponding position. The clerk may now read the computed product on the indicating disks 23. If the transaction is not completed the machine may be left in this position, and when a second computation is to be made it will not need to be reset, inasmuch as the setting handles 11 and other register-controlling devices are automatically reset to normal position during each computation. If, on the other hand, the transaction is to be entered in the cash register, all that is necessary is to give the operating-gear 85 two additional rotations, as is the case when the cash register is used alone. As at this time gear 85 will be in mesh with the large gear 83, shaft 82, which is the main operating shaft of the cash register, will be given a complete rotation. This will cause counter 31 to be reciprocated over the racks 15, and the transaction will be entered on the said counter.

As hitherto stated, there is provided what may be termed an "alternative controlling means" for the computing devices which may be used in cases involving the computation of other things besides a weight. The parts of the machine referred to are best shown in Figs. 2, 8 and 9. In Fig. 8 is shown a disk 191, having a plurality of graduations and a set of ratchet-teeth, one for each graduation. A pointer 192 is adapted to move over the graduations, and carries a pawl 193 adapted to engage the ratchet-teeth to prevent reverse rotation. This pawl 193 is pivoted on a pin 194 on the said pointer, and is normally forced outward by a spring 195, connected at one end to the pointer, and at the other end to a sliding bar 196. This bar is pivoted at its outer end to the pawl 193, and at its inner end is connected to a bar 197 by a pin and slot connection, which will allow the bar 196 and pawl 193 to ratchet over the teeth of the disk 191 without disturbing the bar 197. At the inner end of the bar 197 is a slot 198, embracing a vertical pin 199, having a cam part 200. When the pointer 192 has been rotated, and pawl 193 engages some one of the ratchet-teeth on disk 191, the pointer will be held in set position against the tension of a spring 201, which normally tends to return the said pointer to zero position. During the operation of the machine the pin 199 is depressed, and its cam part 200 thereby forces bar 197 toward the center, releasing pawl 193 from the ratchet on disk 191, and permitting spring 201 to automatically reset the pointer. This pointer 192 is connected with a bevel gear 203, gearing with a second beveled gear 204, rigid with shaft $50^a$, which bears the controlling disks 51. It will therefore be evident that movement of the pointer will cause the same effect on the controlling disks 51 as will the placing of a weight on the scale-pan. In order to prevent movement of the scale when the quantity indicator is employed, and vice versa, to prevent movement of the quantity indicator when the scale is used, there is provided an interlocking means. It will be seen from Fig. 8 that pointer 192 is provided with a cam 206, which is adapted when the pointer is moved from normal position to engage a bar 207, and move the same laterally. This bar is carried in the center of shaft $50^a$, and is connected thereto by a pin-and-slot connection 208, so as to rotate with the shaft $50^a$, but to be susceptible of a slight longitudinal motion separately therefrom. At the other end of shaft $50^a$ the said shaft is provided with a squared shoulder. When the quantity indicator 192 is moved, its cam 206 will engage the beveled end of the bar 207, and force it toward the right in Fig. 2, thereby throwing the shoulder 209 of the shaft $50^a$ into a squared notch 210 in the supporting frame. The shaft $50^a$ is not made all in one piece, but is separated at the point $211^a$ with a tongue and groove connection between the two parts. The dividing of the shaft $50^a$ is to enable the setting of the disks 51 by the rotation of the quantity indicator independently of the weighing mechanism. Upon the return of the quantity indicator to normal or zero position the left hand end of the bar 207 (Fig. 2) will be shifted back into engagement with the camming portion of the disk 206 (Figs. 2 and 8) by a spring $50^b$ which surrounds the shaft 50ᵃ and having its ends abutting against the pin of the pin and slot connection 208 and a boss of the machine frame, the right hand portion of the shaft 50ᵃ being returned into engagement with the other portion of the shaft bearing the disks 51 by suitable connection with the right hand end of the bar 207 movable therein. The gear 203 has a portion of its teeth cut away as at 203ᵃ (Fig. 8) so that when the shaft 50ᵃ is rotated by the weighing mechanism the quantity indicator will not be affected. This lateral motion of bar 207 will therefore throw shoulder 209 into the notch 210 and lock the scale-pan and the devices operated thereby, but will not prevent the rotation of the determining disks 51 from the quantity indicator. If, on the other hand, an operation with the scale is desired, the rotation of the pinion 49 will rotate the squared shoulder 209, so that it will then be impossible to move the quantity indicator, inasmuch as a movement thereof would necessitate the longitudinal shift of the rod 207, but this will be prevented by the squared shoulder 209 being out of register with the notch 210. This construction evidently provides for the interlocking above referred to.

As a means of operating the pin 199 to release the quantity indicator and allow it to be returned to zero, there is shown a lever 211 connected by a pin-and-slot connection to a lever 212, mounted on shaft 148, this shaft being also shown in Fig. 5, and it will be remembered that the rearward movement of link 126 for the purpose of resetting the setting levers also serves to rock this lever 147. Such rocking will evidently also rock the lever 212 and cause a depression of pin 199, thereby releasing the pawl 193 from the ratchet on disk 191. The spring 201 will then immediately return the pointer 192 and the controlling disks 51 to normal position.

The operation of the machine as described has been quite fully stated heretofore, and will, it is thought, be clear from the description.

It will be seen from the previous description that the desired objects are attained in a very satisfactory manner by this mechanism. The cash register may be used in the ordinary way by setting the handles 11 to the desired amount, and then giving the main operating handle two complete rotations. If, however, a computation of weight is desired, the mere placing of the article on the scale-pan, together with the depression of the proper rate per unit key or keys, and one turn of the same operating handle will indicate to the operator the computed amount, and will also place the controlling devices of the cash register in position for registering said amount without further effort on the part of the operator. If, on the other hand, a computation involving a quantity not susceptible of weight is desired, the mere movement of the quantity pointer will disconnect the scale and will control the computing in exactly the same manner as the scale is intended to do.

Fig. 3 shows a device for preventing continued oscillation of the scale beam 42 during the operation of the accounting mechanism. Such device consists of means for intermittently and lightly interrupting the oscillation of the beam. A pad 231 is mounted on one end of the lever 232 and in position to engage a disk 233 on the shaft 50ᵃ. The shaft 50ᵃ of course oscillates with the scale beam 42 so that when the pad 231 is brought into contact with the disk, oscillation of the shaft 50ᵃ will be checked. A toothed disk 234 is rigidly mounted on the shaft 96 and coacting with the teeth on said disk is a roller 235 which is mounted on a link 236. One end of the link 236 is connected to the lever 232, so of course when the teeth on disk 234 engage the roller on the link 236 the pad 231 will be moved against and away from the disk 233 several times. The teeth on the disk 234 are so located on the disk as to engage the roller 235 when the shaft 96 first begins to rotate.

In order to prevent the premature dropping of the bars 52, there is provided a supporting device additional to the supports 53. In Fig. 6 is shown a bar 227, which has a squared shoulder adapted to move under projections 228 on bars 52. On one end of this bar is an arm 229 (Fig. 5) adapted to be depressed by a cam 230 rigid on the shaft 96. It will be clear that when the shaft 96 is rotated by turning the main handle, the bar 227 will be rocked and its squared shoulder moved out of the path of projections 228. The bars 52 which have been released by the depression of rate keys 58 will then drop to positions depending upon the position of the disks.

While the form of mechanism here shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed as new is as follows;

1. In a machine of the class described, the combination with weighing mechanism, of means for computing value therefrom and indicating same, a totalizing means and connections for operating same under control of the value computing means and after the latter has been positioned at the computed value.

2. In a machine of the character described, the combination with weighing mechanism, of devices for indicating rate per unit, computing mechanism controlled by said devices and said mechanism, accounting devices and means for transferring the indication of the computing mechanism when computed to said accounting devices.

3. In a machine of the character described, the combination with a weighing mechanism, of mechanism for indicating rate per unit, price computing mechanism controlled in its movement by said rate mechanism and said weighing mechanism, and automatically computing and indicating the product, accounting devices, and means for transferring the indication of the computing device when computed to said accounting devices when desired.

4. In a machine of the character described, the combination with a weighing scale, of controlling devices set thereby, rate mechanism, computing mechanism regulated in its movement by said controlling devices and said rate mechanism, and having differential movement, accounting devices and means for transferring to said accounting devices the indication of said computing devices.

5. In a machine of the character described, the combination with weighing mechanism, of rate mechanism, a computing mechanism controlled by both the weighing and rate mechanism, an accounting device and operating mechanism therefor, and means for restoring the computing device to normal position thereby setting the accounting device operating mechanism.

6. In a machine of the class described, the combination with a weighing scale, controlling disks set thereby, computing mechanism controlled as to its extent of movement by the controlling disks, a totalizer and operating devices therefor, and means for transferring the indication of the computing mechanism to said totalizer operating devices by resetting the computing mechanism.

7. In a machine of the character described, the combination with weighing mechanism, of computing mechanism having its movement controlled by the weighing mechanism, indicating devices, means for restoring the computing mechanism to a normal position and thereby setting and indicating devices, and means for preserving in the machine when desired an entry of the amount set upon the indicating devices.

8. In a machine of the character described, the combination with weighing mechanism, of computing mechanism controlled thereby, price indicating mechanism, means for transferring the amount set up on the computing mechanism to said indicating mechanism, accounting devices, and means for transferring to said accounting devices when desired the amount set up on said indicating mechanism.

9. In a machine of the character described, the combination, with weighing mechanism, of rate per unit devices, computing mechanism controlled by said mechanism and rate per unit devices, indicating mechanism, and means for transferring the computed amount when computed to said indicating mechanism.

10. In a machine of the character described, the combination with a weighing scale, controlling disks set thereby, computing mechanism set from said disks, indicating mechanism, registering mechanism, and means for setting the indicating mechanism to the computed amount as a preliminary to registration thereof.

11. In a machine of the character described, the combination, with weighing mechanism, computing mechanism controlled thereby, indicating and registering mechanisms, regulated as to extent of movement by said computing mechanism, and means for setting the indicating mechanism to the computed amount as a preliminary to registration thereof.

12. In a machine of the character described, the combination with a weighing mechanism, of a counter, operating devices for said counter, the movement of which is controlled by the weighing mechanism, indicating and registering mechanisms, and means for transferring the amount set up on said counter successively to said mechanisms.

13. In a machine of the character described, the combination with a weighing mechanism, of a counter controlled as to extent of movement by said mechanism, an accounting device, and means for transferring the amount indicated on the counter to the accounting device.

14. In a machine of the class described, the combination with weighing mechanism, of a computing device set under the control thereof, a registering device for retaining an entry of computed amounts in the machine, means for setting the computing device to the computed amount, and means for thereafter operating the registering device to extents determined by the amount computed.

15. In a machine of the class described, the combination with weighing mechanism, of a computing and indicating device controlled thereby, a registering mechanism, means for actuating said registering mechanism to an extent corresponding to the amount on the computing and indicating device when desired, the construction being such that the computing and indicating devices may be restored to normal position without entering the amount on the registering mechanism.

16. In a machine of the character described, the combination with weighing mechanism, of computing and indicating devices controlled thereby, registering mechanism and means for transferring the indication of the computing and indicating devices when computed to the registering mechanism.

17. In a machine of the character described, the combination with weighing mechanism, of computing mechanism controlled thereby, means coöperating with the weighing mechanism for setting the computing mechanism to indicate a desired product, registering mechanism, and means for subsequently operating the registering mechanism to an amount determined by the product indicated by the computing devices.

18. In a machine of the character described, the combination with weighing mechanism, of rate per unit devices, computing devices controlled as to movement by said weighing mechanism and said rate devices, a register, register controlling devices set from the computing devices, and means for operating the register after the register controlling devices have been set.

19. In a machine of the character described, the combination with a weighing scale, of controlling disks set thereby, rate per unit devices, computing mechanism released by said rate device and controlled by the controlling disks, indicating mechanism, and means for transferring the computed product from the computing to the indicating mechanism by restoring the computing mechanism to normal condition.

20. In a machine of the character described, the combination with weighing mechanism, of computing bars set under the control thereof, a subcounter and operating devices, means for adjusting the subcounter from the computing bars, a registering mechanism and operating devices, means for resetting the subcounter and thereby setting the operating devices for the registering mechanism, and means for thereafter operating the registering mechanism.

21. In a machine of the character described, the combination with computing mechanism and registering mechanism, of operating devices for said mechanisms, a handle and connections for moving said operating devices successively, rate per unit devices and means operated under the control thereof for changing the control by the handle from the registering mechanism to the computing mechanism.

22. In a machine of the character described, the combination with a register, and operating devices therefor, of setting devices controlling the register operable by the hand, weighing mechanism, computing mechanism controlled by said weighing mechanism, and means for moving the setting devices for the register controlled by said computing mechanism.

23. In a machine of the character described, the combination with weighing mechanism, a computing mechanism controlled thereby, registering mechanism, setting devices for controlling the registering mechanism, and adapted to be positioned by the hand, and means for positioning the said setting devices through the agency of the computing mechanism.

24. In a computing scale, the combination with weighing mechanism, of controlling disks set thereby, controlling bars equal in number to said disks, rate per unit devices, means operated by the rate devices for releasing a combination of said bars, a counter and indicating devices, means for operating the counter by moving said bars, and means for transferring the amount on the counter to the indicating devices.

25. In a computing scale the combination with weighing mechanism, of rate per unit devices, computing mechanism, including a counter, controlled by the weighing mechanism, an indicating mechanism, and means for actuating said indicating mechanism from the counter.

26. In a computing scale the combination with weighing mechanism, of rate per unit devices, computing mechanism including a counter and controlled by said weighing mechanism, indicating mechanism, and means for restoring the counter to normal position and thereby setting the indicating mechanism.

27. In a computing scale the combination with weighing mechanism, of computing mechanism controlled by said weighing mechanism, rate per unit devices, for also controlling said computing mechanism, a counter moved by the computing mechanism and determining the desired product, an indicating mechanism and means for operating same controlled from the counter.

28. In a machine of the class described, the combination with weighing mechanism, and computing and indicating mechanism, of means controlled by said weighing mechanism for determining the extent of movement of said computing and indicating mechanism, and an alternative means comprising a quantity indicator for also determining the extent of movement of said computing and indicating mechanism.

29. In a machine of the class described, the combination, with weighing mechanism, computing and indicating mechanisms, having their movement controlled from said weighing mechanism, an alternative controlling means for said computing and indicating mechanisms, comprising a quantity indicator, and interlocking means preventing the operation of the weighing mechanism and the quantity indicator at the same operation of the machine.

30. In a machine of the class described, the combination with weighing mechanism, of indicating mechanism controlled thereby, accounting devices adapted to be controlled by the indicating mechanism, and means for resetting the indicating mechanism to normal position when it is not desired to enter the amount in the accounting devices.

31. In a machine of the class described, the combination with weighing mechanism, of indicating mechanism controlled thereby, accounting devices, means for operating the accounting device to an amount determined by the indicating mechanism, and means for restoring the indicating mechanism to normal position as a preliminary to a succeeding operation of the machine.

32. In a machine of the class described, the combination with weighing mechanism, of indicating mechanism controlled thereby, accounting devices, means for transferring the indication to the accounting devices by a continued operation of the machine, and means for destroying the previous indication when it is not desired to enter same in the accounting devices.

33. In a machine of the class described, the combination with weighing mechanism, of means for indicating a computation controlled by said weighing mechanism, accounting devices and connections whereby said accounting devices may be controlled from said indicating means, and means for resetting the indicating means without entering the indication on the accounting devices.

34. In a machine of the class described, the combination with weighing mechanism, of indicating mechanism controlled thereby, accounting devices and connections whereby said accounting devices may be operated from said indicating mechanism, and means for resetting said indicating mechanism to normal as a preliminary to setting up a new indication, without entering the indication on the accounting device.

35. In a machine of the class described, the combination with weighing mechanism, of means for computing value therefrom, a totalizing mechanism, and means operated by the computing means after the same has been positioned at the computed value for actuating said totalizing means.

36. In a machine of the class described, the combination with a computing weighing scale including a detail computing means, of a totalizing means, an operating mechanism having a defined cycle of movement, means whereby said operating mechanism actuates said detail computing means during a definite part of said cycle of movement, and means whereby said operating mechanism actuates said totalizing means under control of said detail computing means during another part of said cycle of movement.

37. In a machine of the class described, the combination with weighing mechanism, of rate per unit devices, computing mechanism controlled by said weighing mechanism and rate per unit devices, indicating mechanism, and an operating mechanism for positioning said indicating mechanism under control of said computing mechanism in accordance with computed amounts.

38. In a machine of the class described, the combination with weighing mechanism, of rate per unit devices, computing mechanism caused to be set under control of said weighing mechanism and said rate per unit devices, an indicating mechanism, and an operating mechanism for resetting said computing mechanism, with connections whereby the said resetting positions the indicating mechanism to exhibit the computed amounts.

39. In a machine of the class described, the combination with a weighing mechanism, of graduated elements positioned thereby, devices movable to engage said graduated elements, rate per unit devices normally holding said movable devices but when operated effective to release said devices, means for restoring said movable devices after they have been positioned and a counter operated by said movable devices as they are restored to normal position.

40. In a machine of the class described, the combination with a weighing mechanism of graduated elements positioned thereby, rack bars movable to engage said graduated elements, rate per unit devices normally holding said rack bars against movement but when operated effective to release said bars, means for restoring said rack bars when they have been positioned, and a counter actuated by said rack bars.

41. In a machine of the class described, the combination with a set of graduated elements, of means for differentially positioning them, rack bars movable to engage said graduated elements, rate per unit devices normally holding said rack bars but when operated effective to release said bars, means for restoring said rack bars after they have been positioned, and a counter actuated by the movement of said rack bars.

42. In a machine of the class described, the combination with a set of graduated elements, and means for differentially positioning them, of a counter, operating devices for said counter positioned to have their movement controlled by said graduated elements, means comprising rate per unit devices normally holding said operating devices against movement but when operated effective to release said devices, and means for restoring said operating devices to normal position after they have been positioned.

43. In a machine of the class described, the combination with a set of differentially movable elements, and means for positioning them, of a counter, operating devices for said counter positioned to have their movement determined by said movable elements, a set of rate per unit devices normally holding said counter operating devices against movement, and mechanism for engaging and disengaging said counter and operating devices.

44. In a machine of the class described the combination with a set of movable elements, of weighing mechanism and a quantity indicator for differentially positioning said elements, a counter, operating devices for said counter positioned to have their movement determined by said movable elements, rate per unit mechanism normally preventing movement of said operating devices but when operated effective to release said devices and means for restoring said operating devices to normal position and thereby actuating said counter.

45. In a machine of the class described, the combination with a plurality of graduated elements, of means, including a weighing mechanism and a quantity indicator for differentially positioning said graduated elements, a counter, operating racks for said counter movable to engage said graduated elements, rate per unit mechanism normally holding said operating racks against movement, but manually operable to release any desired operating racks, and means for engaging and disengaging said counter and racks.

46. In a machine of the class described, the combination with graduated elements, and means for positioning them, of a counter, operating racks for said counter, rate per unit mechanism normally holding said operating racks against movement, means for engaging and disengaging said counter and racks, an indicating mechanism, and means for transforming the reading on said counter to said indicating mechanism.

47. In a machine of the class described, the combination with graduated elements, of means, comprising a weighing mechanism and a quantity indicator for differentially positioning said elements, a counter, operating mechanism for said counter positioned to move against said graduated elements, rate per unit mechanism for normally holding said operating mechanism against movement but when operated effective to release said devices, an indicating mechanism, and means for transferring the reading on said counter to said indicating mechanism.

48. In a machine of the class described, the combination with a set of graduated elements, of means, comprising a weighing mechanism and a quantity indicator for differentially positioning said graduated elements, a counter having denominational elements, operating racks for said denominational elements positioned and moved to engage said graduated elements, rate per unit keys for releasing said racks, a plurality of devices, such as pivoted frames for restoring said racks to normal position in successive sets, means for engaging and disengaging said counter and racks, and transfer mechanism for said counter elements constructed to operate a plurality of times at each operation of the machine.

49. In a machine of the class described, the combination with a computing mechanism, of means for totalizing the computations of said mechanism, an operating device common to both the computing mechanism and totalizing means, and means controlling the establishment successively of an operative relation of the operating device with the computing mechanism and the totalizing means.

50. In a machine of the class described, the combination with a computing mechanism, of means for totalizing the computations of said mechanism, an operating device common to both the computing mechanism and the totalizing means, and manipulative devices for successively connecting the computing mechanism and the totalizing means to the operating device.

51. In a machine of the class described, the combination with a computing mechanism, of means for totalizing the computations of said mechanism, an operating device common to both the computing mechanism and the totalizing means, manipulative devices and weighing mechanism for determining the factors of computations, and means controlled by the manipulative devices for connecting the computing mechanism and the operative device, and disconnecting the latter device and the totalizing means.

52. In a machine of the class described, the combination with a computing mechanism, of means for totalizing the computations of said mechanism, independent sets of actuators for the computing mechanism and the totalizing means, an operating mechanism, and means controlled thereby for successively operating the different sets of actuators.

53. In a machine of the class described, the combination with a sub-counter, and actuators therefor, of a totalizer, a separate set of actuators for said totalizer, an operating mechanism, and means controlled by the latter mechanism for operating the sub-counter actuators and then resetting the sub-counter, with connections whereby the resetting of the sub-counter operates the totalizer actuators.

54. In a machine of the class described, the combination with computing mechanism, of a registering mechanism, and means whereby a computed amount may be transferred from the computing mechanism to the registering mechanism or the computation destroyed without such transfer.

55. In a machine of the class described, the combination with a computing mechanism, of quantity indicating means and rate per unit indicating means thereof, means for indicating the computed amount, registering mechanism, and means whereby the amount computed and indicated may be subsequently entered in the registering mechanism or the computing mechanism returned to normal position without such registration.

56. In a machine of the class described, the combination with multiplying mechanism adapted to indicate the product in the multiplying operation, a registering mechanism, and means whereby the indicated product may after its determination be entered in the registering mechanism.

57. In a machine of the class described, the combination with multiplying mechanism, a counter for receiving the product of the multiplying operation, a second counter and means whereby the product on the first counter may be transferred to the second counter or the product entered on the first counter be removed without such transfer.

58. In a machine of the class described, the combination of computing mechanism; separate quantity and rate per unit determining means therefor; a counter for receiving amounts computed by the computing mechanism; a totalizer; a set of actuators therefor; connections whereby the actuators may be set by the return of the counter to zero; and means whereby the totalizer may be actuated in accordance with the adjusted actuators if desired.

59. In a machine of the class described, the combination of multiplying mechanism; separate manipulative means for determining factors to be multiplied; a cash register including indicating and registering mechanism; connections for indicating in the indicating mechanism of the cash register the product of a multiplying operation; and means whereby the computed product may be entered in the registering mechanism of the cash register or the computation destroyed without such entry.

In testimony whereof I affix my signature in the presence of two witnesses.

EDMUND S. CHURCH.

Witnesses:
ROY C. GLASS,
CARL W. BENST.